(12) United States Patent
Lee et al.

(10) Patent No.: US 11,004,371 B2
(45) Date of Patent: May 11, 2021

(54) DISPLAY DEVICE AND METHOD FOR INSPECTION THEREOF

(71) Applicant: SAMSUNG DISPLAY CO., LTD., Yongin-si (KR)

(72) Inventors: Kwang Sae Lee, Asan-si (KR); Won Kyu Kwak, Seongnam-si (KR); Ki Myeong Eom, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 19 days.

(21) Appl. No.: 16/669,734

(22) Filed: Oct. 31, 2019

(65) Prior Publication Data

US 2020/0143722 A1 May 7, 2020

(30) Foreign Application Priority Data

Nov. 2, 2018 (KR) .......................... 10-2018-0133764

(51) Int. Cl.
  *G09G 3/3291* (2016.01)
  *G09G 3/00* (2006.01)
  *G06F 1/16* (2006.01)
(52) U.S. Cl.
  CPC ........... *G09G 3/006* (2013.01); *G06F 1/1652* (2013.01); *G09G 3/3291* (2013.01)
(58) Field of Classification Search
  CPC .... G09G 3/006; G09G 3/3291; G09G 3/3225; G09G 3/2003; G06F 1/1652; H01L 27/124; G02F 1/1309
  See application file for complete search history.

(56) References Cited

U.S. PATENT DOCUMENTS

2014/0176844 A1* 6/2014 Yanagisawa ........... G09G 3/006
  349/43
2016/0372017 A1* 12/2016 Byun ....................... G09G 3/20
  (Continued)

FOREIGN PATENT DOCUMENTS

EP 3176771 6/2017
EP 3276595 1/2018
(Continued)

OTHER PUBLICATIONS

European Search Report dated Jan. 21, 2020, issued in corresponding European Patent Application No. 19205959.0.

*Primary Examiner* — Jennifer Mehmood
*Assistant Examiner* — James S Nokham
(74) *Attorney, Agent, or Firm* — F. Chau & Associates, LLC

(57) ABSTRACT

A display device includes a display area configured to include a plurality of pixels and a plurality of data lines connected to the pixels. A hole area is disposed within the display area. A hole crack detection line is disposed adjacent to the hole area and surrounds the hole area. The device includes first and second detection lines which include first and second detection transfer lines and first and second detection receiving lines, respectively. A test controller electrically connects the first detection receiving line to a first data line and the second detection receiving line to a second data line. Pixels connected to the first data line that is connected to a first bright-line transistor and pixels connected to the second data line that is connected to a second bright-line transistor are configured to emit light when a crack occurs in the hole crack detection line.

20 Claims, 12 Drawing Sheets

(56) References Cited

U.S. PATENT DOCUMENTS

2017/0162637 A1\* 6/2017 Choi .................... G09G 3/3225
2017/0288003 A1\* 10/2017 Kim ..................... H01L 27/124
2018/0284924 A1\* 10/2018 Watanabe ......... G02F 1/136286

FOREIGN PATENT DOCUMENTS

| EP | 3279886 | 2/2018 |
|---|---|---|
| KR | 10-2017-0019553 | 6/2007 |
| KR | 10-0736279 | 6/2007 |
| KR | 10-2016-0017845 | 2/2016 |
| KR | 10-1783953 | 9/2017 |

\* cited by examiner

DISPLAY DEVICE AND METHOD FOR INSPECTION THEREOF

CROSS-REFERENCE TO RELATED APPLICATION

This application claims priority under 35 U.S.C. § 119 to Korean Patent Application No. 10-2018-0133764, filed on Nov. 2, 2018 in the Korean Intellectual Property Office, the disclosure of which is incorporated by reference in its entirety herein.

TECHNICAL FIELD

Embodiments of the present invention relate to a display device and a method for inspection thereof, and more particularly to a display device including a display panel having a hole formed therein and a method for inspection thereof.

DISCUSSION OF RELATED ART

A display device such as a liquid crystal display (LCD) or an organic light emitting diode display (OLED) includes a display panel having a plurality of pixels that are configured to display an image and a plurality of signal lines. Each pixel may include a pixel electrode for receiving a data signal. The pixel electrode may be connected to at least one transistor to receive the data signal. The display panel may include a plurality of stacked layers.

When a display panel is impacted, cracks may be formed on a substrate or on the stacked layers. The cracks may grow over time or spread to other layers or other regions, which can lead to poor display panel quality. For example, a signal line such as a data line or a scan line may be disconnected by the cracks or may increase in resistance, and moisture may penetrate into the display panel through the cracks, thereby reducing element reliability. As a result, various problems such as pixels of the display panel not emitting light, pixels erroneously emitting light, and the like may occur.

In particular, recently developed flexible displays may be configured to be curved or bent during manufacture or use. Therefore, even when the substrate or stacked layers of the display panel include relatively minute cracks, the minute cracks may develop into larger cracks due to the curving or bending of the display panel.

Devices such as a camera, a flash, a speaker, and an optical sensor may be disposed in a display area of the display device in order to minimize the non-display area on a front surface of the display device and to maximize the display area to the entire front surface. For example, a hole can be formed in a display panel by punching, and a camera, a flash, a speaker, a photosensor, etc. may be mounted in the hole. Cracks may occur during a process of forming the hole in the display panel, or cracks may occur in a portion exposed by the hole.

SUMMARY

Exemplary embodiments of the present invention provide a display device and a method for inspection thereof which detects cracks that may occur in a display panel having a hole formed therein.

In an exemplary embodiment of the present invention, a display device includes a display area that includes a plurality of pixels and a plurality of data lines connected to the pixels. A hole area is disposed within the display area. A hole crack detection line is disposed adjacent to the hole area. The hole crack detection line surrounds the hole area and has a first end and a second end that are separated from each other. A first detection line includes a first detection transfer line connected to the first end of the hole crack detection line and a first detection receiving line connected to the second end of the hole crack detection line. A second detection line includes a second detection transfer line connected to the first end of the hole crack detection line and a second detection receiving line connected to the second end of the hole crack detection line. A test controller is configured to electrically connect the first detection receiving line to a first data line of the plurality of data lines and the second detection receiving line to a second data line of the plurality of the data lines.

In an exemplary embodiment of the present invention, a method for inspection of a display device that includes a display area including a plurality of pixels and a plurality of data lines connected with the pixels is provided. The method includes applying a first test voltage to a first detection line, the first detection line being connected to a hole crack detection line that is disposed adjacent to a hole area disposed in a display area of the display device. A second test voltage is applied to a second detection line which is connected with the hole crack detection line. The first detection line is electronically connected to a first data line of the plurality of data lines through a first bright-line transistor. The second detection line is electrically connected to a second data line of the plurality of data lines through a second bright-line transistor.

In an exemplary embodiment, a method for inspection of a display device including a plurality of pixels and a hole area disposed in the display area is provided. The method includes emitting light by a plurality of pixels included in a first bright line and a second bright line that are electrically connected to a hole crack detection line disposed adjacent to the hole area and surrounds the hole area. The first bright line and the second bright line are disposed at a central portion of the display area.

DETAILED DESCRIPTION OF THE EXEMPLARY EMBODIMENTS

Figure 1:
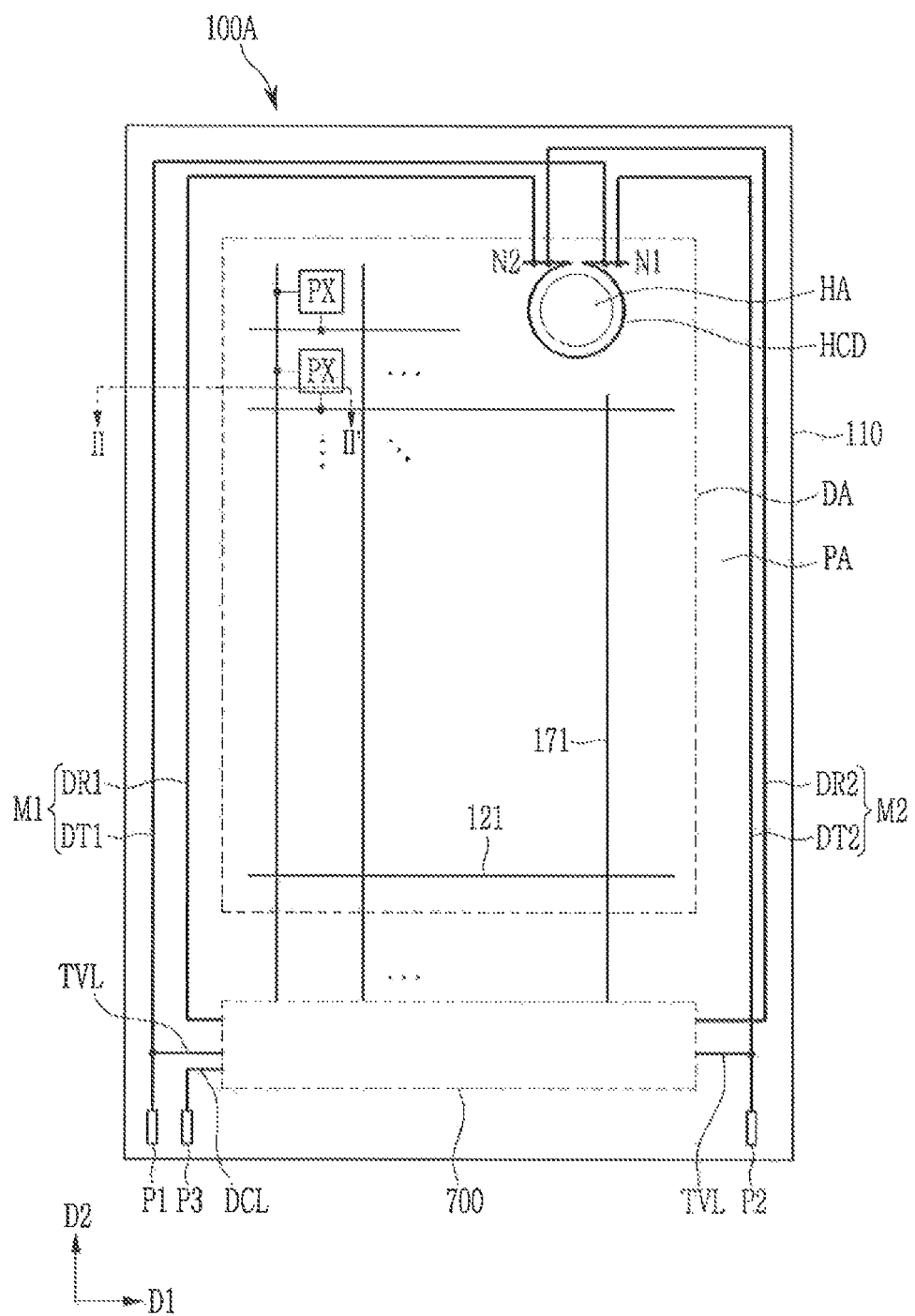
FIG. 1 illustrates a top plan view of a display device according to an exemplary embodiment of the present invention.

Exemplary embodiments of the present invention will be described more fully hereinafter with reference to the accompanying drawings. As those skilled in the art would realize, the described exemplary embodiments may be modified in various different ways, without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, exemplary embodiments of the present invention are not limited to the illustrated sizes and thicknesses. In the drawings, the thicknesses of layers, films, panels, regions, etc., may be exaggerated for clarity. In the drawings, for better understanding and ease of description, the thicknesses of some layers and areas may be exaggerated.

It will be understood that when an element such as a layer, film, region, or substrate is referred to as being "on" another element, the element may be directly on the other element or intervening elements may also be present. In contrast, when an element is referred to as being "directly on" another element, there are no intervening elements present. Further, the word "over" or "on" means positioning on or below the object portion, and does not necessarily mean positioning on the upper side of the object portion.

In addition, unless explicitly described to the contrary, the word "comprise" and variations such as "comprises" or "comprising" will be understood to imply the inclusion of stated elements but not the exclusion of any other elements.

Hereinafter, a display device according to an exemplary embodiment will be described with reference to FIG. 1 to FIG. 3, and an inspecting method of a display device according to an exemplary embodiment will be described with reference to FIG. 4 and FIG. 5.

FIG. 1 illustrates a top plan view of a display device according to an exemplary embodiment of the present invention.

Referring to FIG. 1, in an exemplary embodiment, the display device includes a display panel 100A including a display area DA, a peripheral area PA, and a hole area HA. The display panel 100A may include a substrate 110. The substrate 110 may be divided into the display area DA and the peripheral area PA.

The display area DA is an area in which an image may be displayed. The display area DA includes a plurality of pixels PX and a plurality of signal lines arranged on a plane parallel to a first direction D1 and a second direction D2. The first direction D1 may be perpendicular to the second direction D2.

The signal lines includes a plurality of gate lines 121 that are configured to transfer gate signals and a plurality of data lines 171 that are configured to transfer data signals. In an exemplary embodiment, the plurality of gate lines 121 may extend generally in the first direction D1 and may be parallel to each other. The data lines 171 may extend generally in the second direction D2 and may be parallel to each other. The gate lines 121 and the data lines 171 may cross each other in the display area DA.

Each of the pixels PX may include at least one switching element and a pixel electrode connected thereto. For example, a pixel PX in the exemplary embodiment shown in FIG. 2 includes a switching element TRa and a pixel electrode 191. The switching element may be connected to at least one gate line 121 and at least one data line 171. The switching element may be a three-terminal element such as a transistor integrated in the display panel 100A. The switching element may be turned on or off depending on a gate signal transferred by the gate line 121 to selectively transfer the data signal to the pixel electrode.

Each of the pixels PX may be configured to emit light of one of primary colors or white light. Examples of the primary colors may include three primary colors of red, green, and blue. Other examples of the primary colors may include yellow, cyan, and magenta.

The substrate 110 may include glass, plastic, etc. In some exemplary embodiments, the substrate may be flexible. For example, the substrate 110 may include various plastics such as polyethylene terephthalate (PET), polyethylene naphthalate (PEN), polycarbonate (PC), polyarylate (PAR), polyetherimide (PEI), polyethersulfone, polyimide (PI), or the like, or a metal thin film, glass, or the like.

The hole area HA may be disposed in the display area DA. The hole area HA may be a region in which a hole is formed, such as by punching the substrate 110 of the display panel. The hole area HA may provide a region for arranging devices such as a camera, a flash, a speaker, an optical sensor, and the like in the display area DA.

The display area DA includes a hole crack detection line HCD that is arranged adjacent to the hole area HA. As shown in FIG. 1, the hole crack detection line HCD may have a first end N1 and a second end N2 that are separated from each other. The hole crack detection line may be configured to surround a periphery of the hole area HA. For example, in one exemplary embodiment, the hole crack detection line HCD may surround the periphery of the hole area HA in an approximate shape of an inverted omega (Ω). The hole crack detection line HCD may be a wire configured for detecting a crack in the vicinity of the hole area HA.

The peripheral area PA may surround the display area DA and is positioned outside of the display area DA. The peripheral area PA may include a first detection line M1, a second detection line M2, a test voltage line TVL, a detection control line DCL, a test controller 700, and a plurality of test pads P1, P2, and P3. The peripheral area PA may include a gate driver (not illustrated) connected to the gate lines 121 to output a gate signal.

The first detection line M1 may include a first detection transfer line DT1 and a first detection receiving line DR1. The first detection transfer line DT1 may include a first end connected to the first test pad P1 and a second end connected to the first end N1 of the hole crack detection line HCD. The first detection receiving line DR1 may include a first end connected to the test controller 700 and a second end connected to the second end N2 of the hole crack detection line HCD.

The first detection transfer line DT1 and the first detection receiving line DR1 may be disposed in the peripheral area PA at left and upper sides of the display area DA. The first detection transfer line DT1 and the first detection receiving line DR1 may be connected to the hole crack detection line HCD. Each of the first detection transfer line DT1 and the first detection receiving line DR1 may include a portion that is configured to extend within the peripheral area PA along a left edge of the display area DA and a portion that is configured to extend within the peripheral area PA along an upper edge of the display area DA. In an exemplary embodiment, the first detection transfer line DT1 and the first detection receiving line DR1 may extend in parallel on the peripheral area PA along an edge of the display area DA.

The second detection line M2 may include a second detection transfer line DT2 and a second detection receiving line DR2. The second detection transfer line DT2 may include a first end connected to the second test pad P2 and a second end connected to the first end N1 of the hole crack detection line HCD. The second detection receiving line DR2 may include a first end connected to the test controller 700 and a second end connected to the second end N2 of the hole crack detection line HCD.

The second detection transfer line DT2 and the second detection receiving line DR2 may be disposed in the peripheral area PA along right and upper sides of the display area DA. The second detection transfer line DT2 and the second detection receiving line DR2 may be connected to the hole crack detection line HCD. Each of the second detection transfer line DT2 and the second detection receiving line DR2 may include a portion that is disposed in the peripheral area PA and is configured to extend along a right edge of the display area DA and a portion that is disposed within the peripheral area PA and extends along an upper edge of the display area DA. In an exemplary embodiment, the second detection transfer line DT2 and the second detection receiving line DR2 may extend in parallel on the peripheral area PA along an edge of the display area DA.

The test voltage line TVL may include a first end connected to the first detection transfer line DT1 and a second end connected to the second detection transfer line DT2. The test voltage line TVL is configured to connect the first detection transfer line DT1 and the second detection transfer line DT2 to each other. The test voltage line TVL may be configured to transfer detection voltages, which are applied to the first detection transfer line DT1 and the second detection transfer line DT2 through the first test pad P1 and the second test pad P2, to the test controller 700.

A detection control line DCL may include a first end connected to the third test pad P3 and a second end connected to the test controller 700.

In an exemplary embodiment, the first to third test pads P1, P2, and P3 may be arranged along a lower edge of the substrate 110 in the peripheral area PA.

The test controller 700 may be disposed in the peripheral area PA of the display panel 100A, and connected to a plurality of data lines 171. The test controller 700 may be configured to electrically connect the first detection receiving line DR1 to one of the data lines 171 and electrically connect the second detection receiving line DR2 to another of the data lines 171. In an exemplary embodiment, the test controller 700 may be formed directly on the substrate 110 together with constituent elements such as transistors of the pixels PX. A data driver (not illustrated) may be connected to the data lines 171. The data driver may be disposed in the peripheral area PA or on a printed circuit board (PCB) etc. connected with the peripheral area PA. In an exemplary embodiment, the test controller 700 may be disposed between the display area DA and the data driver. In this embodiment, the data lines 171 may extend beyond the test controller 700 toward the data driver.

When test voltages are applied to the first, second and third test pads P1, P2, and P3, the test controller 700 may be configured to control the pixels PX connected to a first data line of the data lines 171 to emit light in response to a voltage transferred through the first detection transfer line DT1, the hole crack detection line HCD, and the first detection receiving line DR1. When the test voltages are applied to the first, second and third test pads P1, P2, and P3, the test controller 700 may be configured to control the pixels PX connected to a second data line of the data lines 171 to emit light in response to a voltage transferred through the second detection transfer line DR2, the hole crack detection line HCD, and the second detection receiving line DR2. A first bright line may be displayed by the emission of light by the pixels PX connected to the first data line of the data lines 171. A second bright line may be displayed by the emission of light of the pixels PX connected to the second data line of the data lines 171. The display of the first bright line and/or the second bright line on the display indicates the presence of hole cracks, first detection line defects, second detection line defects, and/or the like. A detailed description of the method for inspection of such a display device will be described later with reference to FIG. 4 and FIGS. 5A to 5C.

Figure 2:
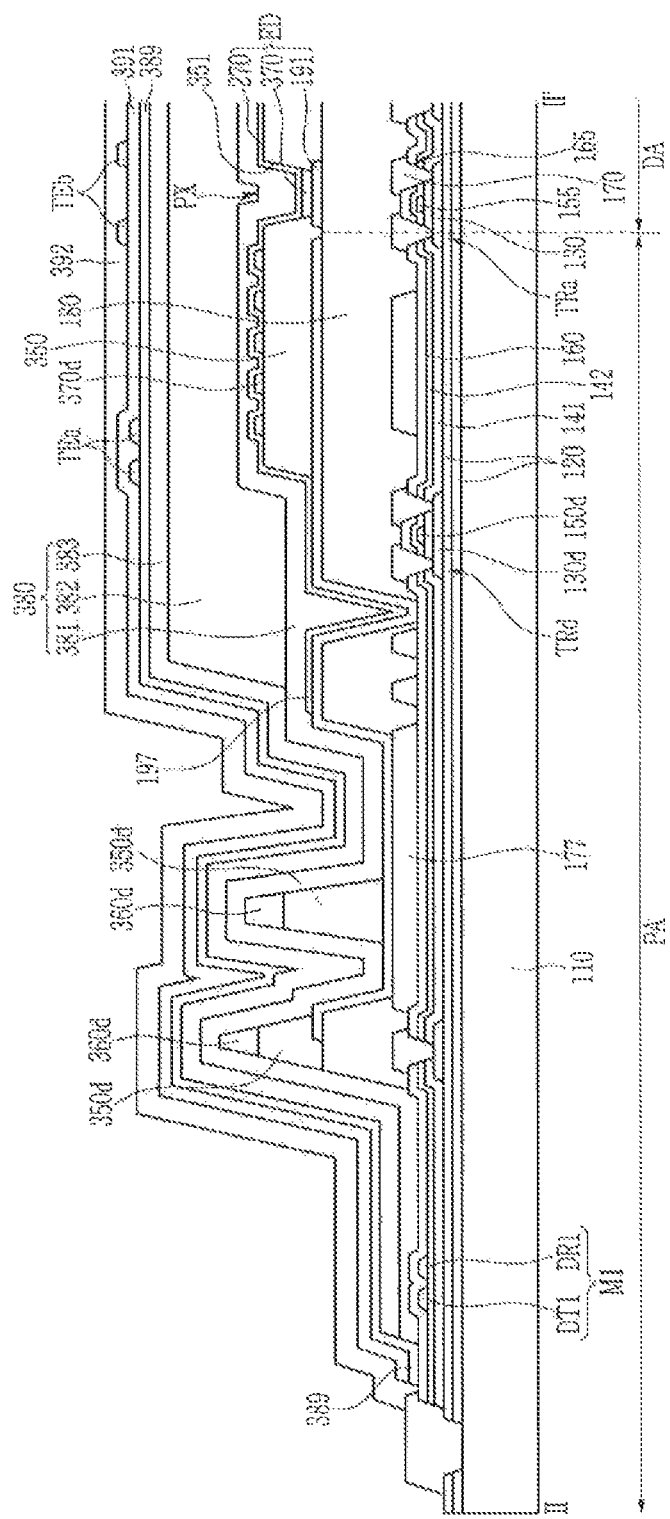
FIG. 2 illustrates a cross-sectional view of the display device taken along a line II-II' of FIG. 1 according to an exemplary embodiment of the present invention.

FIG. 2 illustrates a cross-sectional view of the display device taken along a line II-II' of FIG. 1.

Referring to FIG. 2, a barrier layer 120 may be disposed on the substrate 110. As shown in the exemplary embodiment of FIG. 2, the barrier layer 120 may include a plurality of layers. Alternatively, the barrier layer 120 may be formed as a single layer.

Active patterns 130 and 130d may be disposed on the barrier layer 120. The active patterns 130 and 130d may include an active pattern 130 disposed in the display area DA and an active pattern 130d disposed in the peripheral area PA. Each of the active patterns 130 and 130d may include a source region, a drain region, and a channel region disposed therebetween. In exemplary embodiments, the active patterns may include amorphous silicon, polycrystalline silicon, an oxide semiconductor, or the like.

A first insulating layer 141 may be disposed on the active patterns 130 and 130d. A first conductive layer may be disposed on the first insulating layer 141. The first conductive layer may include a conductor 155 that overlaps the active pattern 130 disposed in the display area DA, a conductor 150d that overlaps the active pattern 130d disposed in the peripheral area PA, and the gate lines 121 and the like described above.

The active pattern 130 of the display area DA and the conductor 155 which overlaps such active pattern may constitute a transistor TRa which functions as a switching element included in each pixel PX. The active pattern 130d of the peripheral area PA and the conductor 150d which overlaps such active pattern may constitute a transistor TRd which functions as a switching element included in the gate driver.

A second insulating layer 142 may be disposed on the first conductive layer and the first insulating layer 141. A second conductive layer may be disposed on the second insulating layer 142. The second conductive layer may include a first detection line M1, a second detection line M2, and a hole crack detection line HCD. According to an exemplary embodiment, at least one of the first detection line M1, the second detection line M2, and the hole crack detection line HCD may be disposed in a conductive layer other than the second conductive layer. For example, in an exemplary embodiment the hole crack detection line HCD may be disposed in a fourth conductive layer or a fifth conductive layer to be described later.

A third insulating layer 160 may be disposed on the second conductive layer and the second insulating layer 142.

In an exemplary embodiment, at least one of the first insulating layer 141, the second insulating layer 142, and the third insulating layer 160 may include an inorganic insulating material such as a silicon nitride (SiNx), a silicon oxide (SiOx), and/or an organic insulating material.

The first insulating layer 141, the second insulating layer 142, and the third insulating layer 160 may include contact holes 165 formed in the source and/or drain regions of the transistors TRa and TRd.

A third conductive layer may be disposed on the third insulating layer 160. The third conductive layer may include a conductor 170 connected to the source region or the drain region of the transistors TRa and TRd through the contact holes 165, a voltage transfer line 177, and the data line 171 as described above. The voltage transfer line 177 may be disposed in the peripheral area PA to transfer a common voltage.

In an exemplary embodiment, at least one of the first conductive layer, the second conductive layer, and the third conductive layer is made of a conductive material such as copper (Cu), aluminum (Al), molybdenum (Mo), titanium (Ti), tantalum (Ta), and an alloy of at least two metals thereof.

A passivation layer 180 may be formed on the third conductive layer and the third insulating layer 160. The passivation layer 180 may include an inorganic insulating material and/or an organic insulating material. In exemplary embodiments, the organic insulating material may include a polyacrylic resin, a polyimide-based resin, and the like. A top surface of the passivation layer 180 may be planarized. The passivation layer 180 may have a contact hole formed on the voltage transfer line 177 disposed in the peripheral area PA.

A pixel electrode layer may be disposed on the passivation layer 180. The pixel electrode layer may include a pixel electrode 191 corresponding to each pixel PX in the display area and a voltage transfer electrode 197 disposed in the peripheral area PA. The voltage transfer electrode 197 may be physically and electrically connected to the voltage transfer line 177 through a contact hole of the passivation layer 180 to receive a common voltage. The pixel electrode layer may include a transflective conductive material or a reflective conductive material.

A pixel definition layer 350 may be disposed on the passivation layer 180 and the pixel electrode layer. The pixel definition layer 350 may have an opening 351 disposed on the pixel electrode 191, and at least one dam portion 350d disposed in the peripheral area PA. The dam portion 350d may extend along an edge of the substrate 110 in a plan view. A spacer 360d may be further disposed on the dam portion 350d. The pixel definition layer 350 may include a photosensitive material such as a polyacrylic resin or a polyimide-based resin.

As illustrated in FIG. 2, the first detection line M1 may be disposed outside (e.g., on a side further away from the display area DA) with respect to the dam portion 350d. Similarly, the second detection line M2 may be disposed outside the dam portion 350d. According to another exemplary embodiment, the first detection line M1 and the second detection line M2 may be disposed inward (e.g., between the display area DA and the dam portion 350d) with respect to the dam portion 350d.

The voltage transfer electrode 197 may include a portion that is not covered by the pixel definition layer 350.

An emission layer 370 may be disposed on the pixel electrode 191. The emission layer 370 may include a portion disposed within the opening 351 of the pixel definition layer 350. The emission layer 370 may further include at least one dummy emission layer 370d disposed in the peripheral area PA and disposed on the pixel definition layer 350. In exemplary embodiments, the emission layer 370 may include an organic emission material or an inorganic emission material.

A common electrode 270 may be disposed on the emission layer 370. The common electrode 270 may also be formed on the pixel definition layer 350 and continuously formed over the pixels PX. The common electrode 270 may be physically and electrically connected to the voltage transfer electrode 197 in the peripheral area PA to receive a common voltage. The common electrode 270 may include a conductive transparent material.

The pixel electrode 191, the emission layer 370, and the common electrode 270 of each pixel PX constitute a light emitting diode ED. The pixel electrode 191 or the common electrode 270 may serve as an anode and the other serves as a cathode.

An encapsulation portion 380 that is configured to protect and encapsulate the light emitting diode ED may be disposed on the common electrode 270. The encapsulation portion 380 may include at least one of inorganic layers 381 and 383 and at least one organic layer 382. At least one of the inorganic layers 381 and 383 and at least one organic layer 382 may be alternately stacked. The organic layer 382 may include an organic material and may have a planarizing property. In an exemplary embodiment, the inorganic layers 381 and 383 may be made of an inorganic material such as an aluminum oxide (AlOx), a silicon oxide (SiOx), a silicon nitride (SiNx), and a silicon oxynitride (SiON).

A planar area of the inorganic layers 381 and 383 may be wider than that of the organic layer 382 which allows the two inorganic layers 381 and 383 to contact each other in the peripheral area PA. In an exemplary embodiment, the inorganic layer 381 disposed at a lowest position of the inorganic layers 381 and 383 may contact an upper surface of the third insulating layer 160 in the peripheral area PA. However, the present inventive concepts are not limited thereto.

An edge of the organic layer 382 included in the encapsulation portion 380 may be disposed between the dam portion 350d and the display area DA. The dam portion 350d may function to prevent the organic material from flowing out when the organic layer 382 of the encapsulation portion 380 is formed.

In an exemplary embodiment, a buffer layer 389 including an inorganic insulating material and/or an organic insulating material may be disposed on the encapsulation portion 380. However, the buffer layer 389 may be omitted.

A fourth conductive layer may be disposed on the buffer layer 389. The fourth conductive layer may include a first touch conductor TEa. A first touch insulation layer 391 may be disposed on the fourth conductive layer. A fifth conductive layer may be disposed on the first touch insulation layer 391. The fifth conductive layer may include a second touch conductor TEb. A second touch insulating layer 392 may be disposed on the fifth conductive layer. The first touch conductor TEa and the second touch conductor TEb constitute a capacitive touch sensor, and may be configured to detect touch information such as touch existence or touch position when an external object is touched.

Hereinafter, a test controller will be described in more detail with reference to FIG. 3 as well as FIG. 1. In the exemplary embodiment of FIG. 3, the data lines 171 of FIG. 1 include m data lines DL1 to DLm, e.g., DL1, DL2, DL3 . . . DL(k−1), DL(k), DL(k+1) . . . DL(m−2), DL(m−1), DLm.

Figure 3:
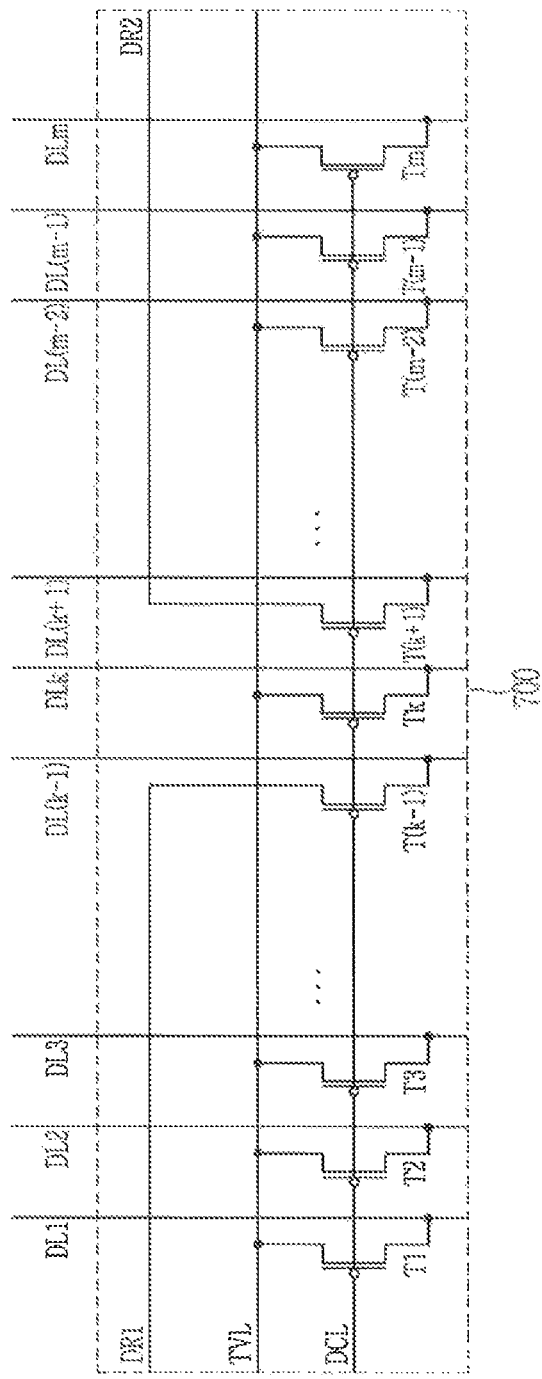
FIG. 3 illustrates a circuit diagram showing a test controller included in the display device of FIG. 1 according to an exemplary embodiment of the present invention.

Referring to FIG. 3, the test controller 700 includes a plurality of test transistors T1 to Tm, e.g., T1, T2, T3 . . . T(k−1), T(k), T(k+1) . . . T(m−2), T(m−1), Tm. The test controller 700 may include a number of test transistors T1 to Tm corresponding to the number m of a plurality of data lines DL1 to DLm. Each of the test transistors T1 to Tm may be respectively connected to the data lines DL1 to DLm. The test transistors T1 to Tm may be formed on the substrate 110 together with the transistors TRa and TRd described in FIG. 2.

Each gate electrode of the test transistors T1 to Tm may be connected to the detection control line DCL. First electrodes of the test transistors T1 to Tm may be respectively connected to the data lines DL1 to DLm. A second electrode of a $(k-1)^{th}$ test transistor T(k−1) of the test transistors T1 to Tm may be connected to the first detection receiving line DR1, a second electrode of a $(k+1)^{th}$ test transistor T(k+1) may be connected to the second detection receiving line DR2, and second electrodes of the other test transistors are connected to test voltage lines TVL. Herein, k may be substantially m/2 so that the transistors (e.g., T(k−1) and T(k+1)) connected to data lines (e.g., DL(k−1) and DL(k+1)) are disposed at a substantially central portion of the display area DA among the data lines DL1 to DLm.

Hereinafter, among the test transistors T1 to Tm, the test transistor T(k−1) connected to the first detection receiving line DR1 is referred to as a first bright-line transistor. The test transistor T(k+1) connected to the second detection receiving line DR2 is referred to as a second bright-line transistor. The data line DL(k−1) connected to the first bright-line transistor is referred to as a first test data line. The data line DL(k+1) connected to the second bright-line transistor is referred to as a second test data line.

In the exemplary embodiment shown in FIG. 3, the data line DL(k−1) connected to the first bright-line transistor and the data line DL(k+1) connected to the second bright-line transistor are separated by one data line DLk. However, the first bright-line transistor and the second bright-line transistor may be connected to data lines which are separated by a plurality of data lines. The interval between the first test data line connected to the first bright-line transistor and the second test data line connected to the second bright-line transistor may be configured so that the first bright line and the second bright line may be distinguished from the center of the display area DA by the naked eye.

In an exemplary embodiment, a plurality of test transistors T1 to Tm may be p-channel electric field effect transistors. A gate-on voltage for turning on the p-channel field-effect transistors is a low-level voltage, and a gate-off voltage for turning off the p-channel field-effect transistors is a high-level voltage. According to an exemplary embodiment, a plurality of test transistors T1 to Tm may be n-channel electric field effect transistors. A gate-on voltage for turning on the n-channel field-effect transistors is a high-level voltage, and a gate-off voltage for turning off the n-channel field-effect transistors is a low-level voltage. Hereinafter, an exemplary embodiment in which the test transistors T1 to Tm are the p-channel electric field effect transistors will be described. In addition, a transistor TRa included in each of the pixels PX may be a p-channel electric field effect transistor.

Hereinafter, an inspecting method of a display device according to an exemplary embodiment of the present invention will be described with reference to FIG. 4 and FIG. 5A to FIG. 5C as well as FIG. 1 and FIG. 3.

Referring to FIG. 4 and FIG. 5A to FIG. 5C, during a test period t1-t2 of the display device, a first test voltage P1(V) of a high level (H) may be applied to the first test pad P1, a second test voltage P2(V) of a high level may be applied to the second test pad P2, and a third test voltage P3(V) of a gate-on voltage may be applied to the third test pad P3. The first test voltage P1(V) and the second test voltage P2(V) may have a same level of voltage. The third test voltage P3(V) may be a voltage that is different from the first test voltage P1(V) and the second test voltage P2(V).

The third test voltage P3(V) applied to the third test pad P3 may be applied to gate electrodes of the test transistors T1 to Tm included in the test controller 700 through the detection control line DCL. The third test voltage P3(V) of the gate-on voltage may be a low level voltage (L) since the test transistors T1 to Tm are the p-channel electric field effect transistors. The test transistors T1 to Tm may be turned on by the third test voltage P3(V) of the gate-on voltage.

During the test period t1-t2, the gate driver may apply a gate signal of a gate-on voltage to the gate lines 121. As the gate signal of the gate-on voltage is applied to the pixels PX, the first and second test voltages P1(V) and P2(V) of high level voltages that are transferred to the data lines DL1 to DLm through the test transistors T1 to Tm which are turned on may be written in the pixels PX. The first and second test voltages P1(V) and P2(V) of the high level voltages turn off the transistor TRa (e.g., the driving transistor connected to the pixel electrode 191) included in each of the pixels PX, so that the pixels PX express black (do not emit light).

However, when a crack occurs in at least one of the first detection line M1, the second detection line M2, and the hole crack detection line HCD, the low level voltage may be applied to at least one of a first test data line and a second test data line by a voltage drop due to an increase of wire resistance. Accordingly, the pixels PX connected to the first test data line or the second test data line may emit white or gray.

Figure 5A:
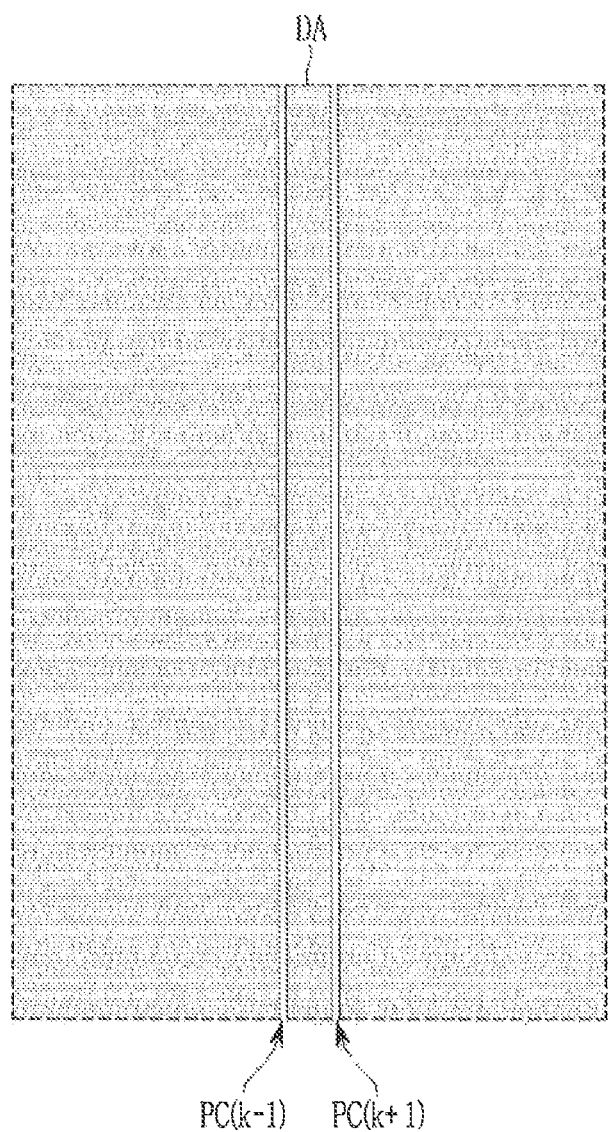
FIG. 5A to FIG. 5C show examples of test results displayed in the display area when a test voltage is applied to the display device according to an exemplary embodiment of the present invention.
Figure 5B:
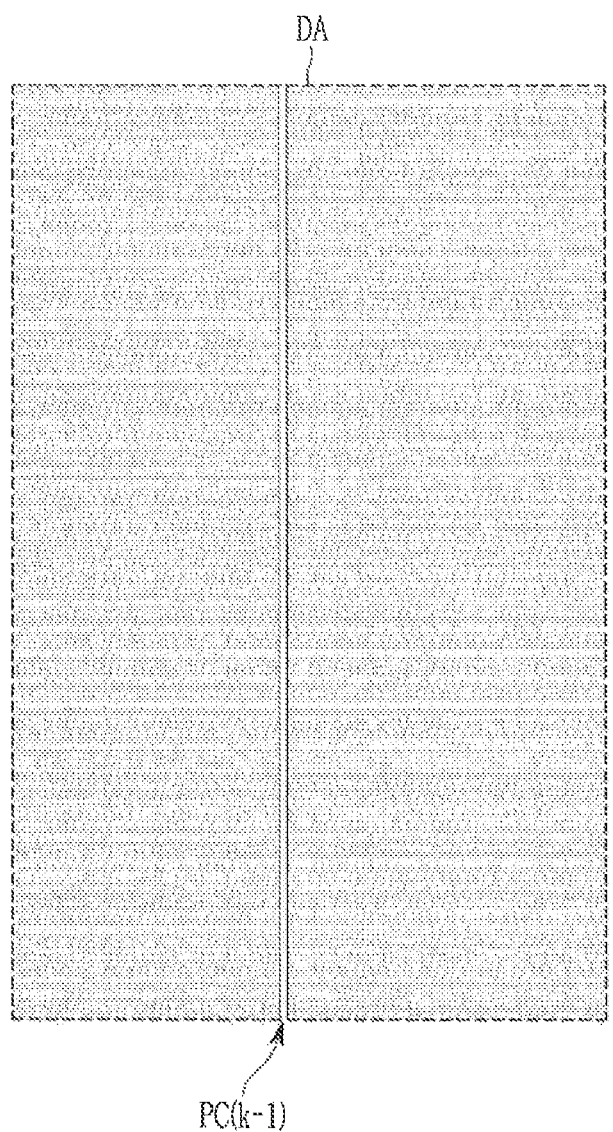

For example, the first test voltage P1(V) of the high level voltage applied to the first test pad P1 may be applied to a second electrode of the first bright-line transistor through the first detection transfer line DT1, the hole crack detection line HCD, and the first detection receiving line DR1, and is transferred to the first test data line through the first bright-line transistor. When a crack occurs in at least one of the first detection line M1 and the hole crack detection line HCD, a low level voltage that is lower than the first test voltage P1(V) may be applied to the first test data line by the voltage drop due to the increase of wire resistance. The first test voltage P1(V) of the high level voltage is changed to the low level voltage by a crack of at least one of the first detection line M1 and the hole crack detection line HCD. Therefore, the pixels PX connected to the first test data line emit white or gray corresponding to the low level voltage. As illustrated in FIG. 5A and FIG. 5B, a pixel array PC(k−1) including the pixels PX connected to the first test data line may be visually recognized as a first bright line.

Figure 5C:
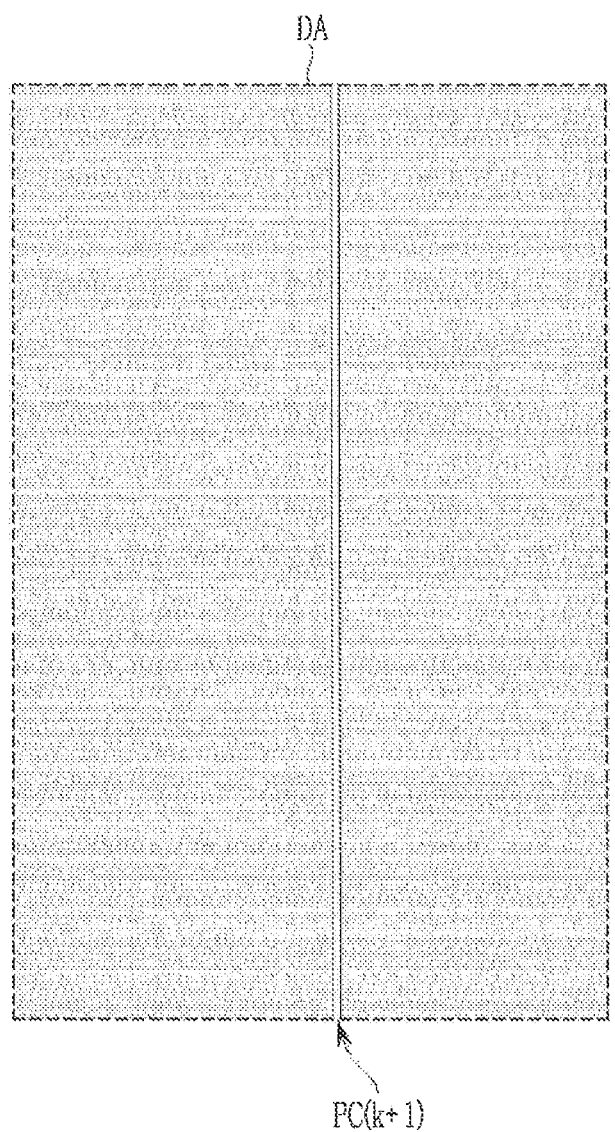

For example, the second test voltage P2(V) of the high level voltage applied to the second test pad P2 is applied to a second electrode of the second bright-line transistor through the second detection transfer line DT2, the hole crack detection line HCD, and the second detection receiving line DR2, and is transferred to the second test data line through the second bright-line transistor. When a crack occurs in at least one of the second detection line M2 and the hole crack detection line HCD, a low level voltage that is lower than the second test voltage P2(V) may be applied to the second test data line by the voltage drop due to the increase of wire resistance. The second test voltage P2(V) of the high level voltage is changed to the low level voltage by a crack of at least one of the second detection line M2 and the hole crack detection line HCD. Therefore, the pixels PX connected to the second test data line emit white or gray corresponding to the low level voltage. As illustrated in FIG. 5A and FIG. 5C, a pixel array PC(k+1) including the pixels PX connected to the second test data line may be visually recognized as a second bright line.

When both of the first bright line and the second bright line are visually recognized as illustrated in FIG. 5A, this indicates that a crack has occurred in the hole crack detection line HCD, which may be determined to be a hole crack defect. While a crack may occur in both the first detection line M1 and the second detection line M2, it is extremely rare for a crack to occur in both the first detection line M1 and the second detection line M2 in the manufacturing process of the display panel 100A. Accordingly, when both of the first bright line and the second bright line are visually recognized, it indicates that a crack has occurred in the vicinity of the hole area HA, which may be determined as a hole crack defect.

When the second bright line is not visually recognized and the first bright line is visually recognized as illustrated in FIG. 5B, this indicates that a crack has not occurred in the second detection line M2 or the hole crack detection line HCD. The appearance of the first bright line on the display indicates that there is a defect of the first detection line M1. This may be determined as a crack that has occurred in the vicinity of an edge of the display panel 100A in which the first detection line M1 extends.

When the first bright line is not visually recognized, but the second bright line is visually recognized as illustrated in FIG. 5C, a crack does not occur in the first detection line M1 or the hole crack detection line HCD. The appearance of the second bright line may be determined as a defect of the second detection line M2. The defect may be determined to be a crack that has occurred in the vicinity of an edge of the display panel 100A in which the second detection line M2 extends.

Hereinafter, a display device according to another exemplary embodiment of the present invention will be described with reference to FIG. 6 to FIG. 8, and an inspecting method of a display device according to another exemplary embodiment of the present invention will be described with reference to FIG. 9. Differences from the aforementioned exemplary embodiment of FIG. 1 to FIG. 5 will be mainly described.

Figure 6:
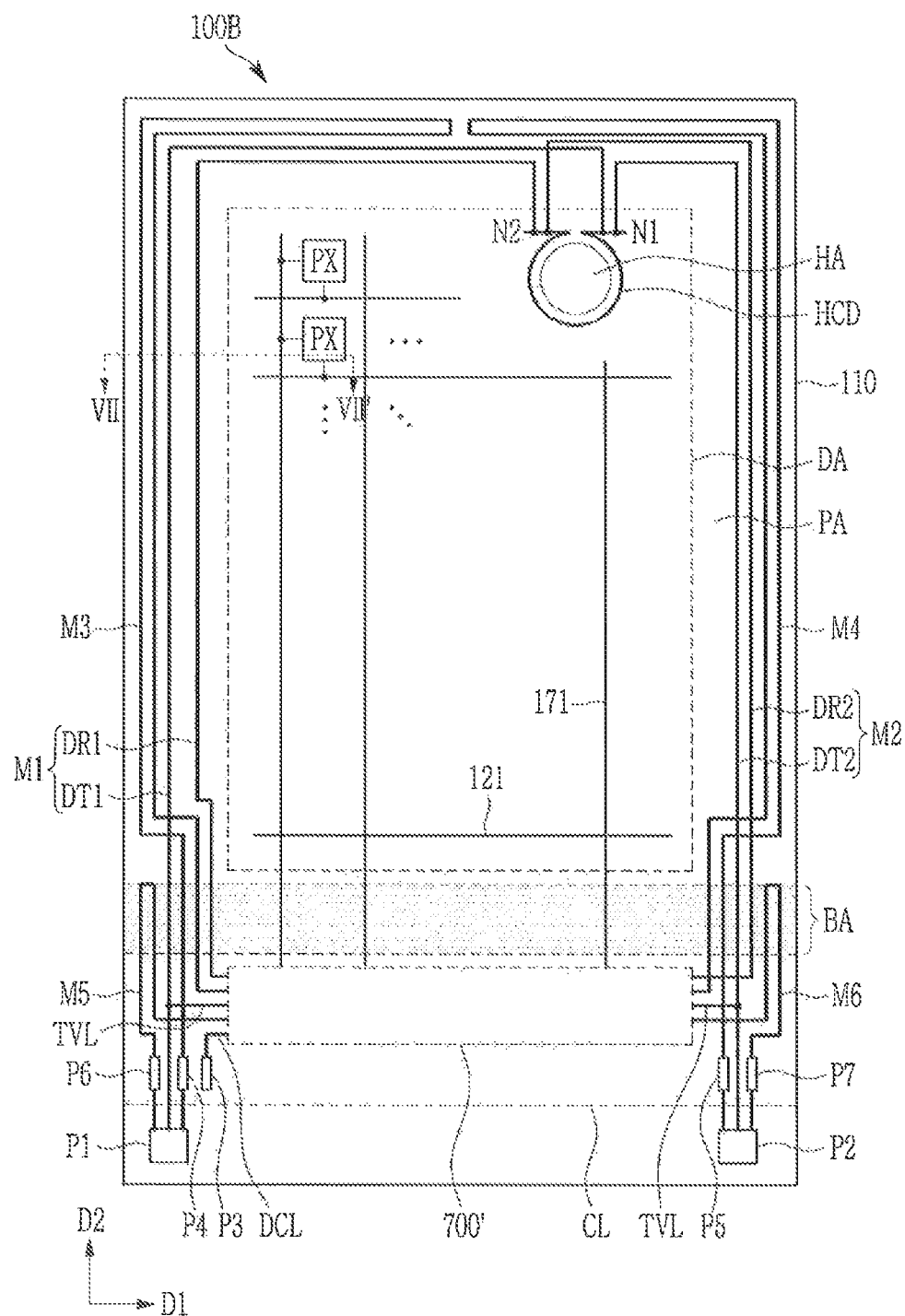
FIG. 6 illustrates a top plan view of a display device according to another exemplary embodiment of the present invention.
Figure 7:
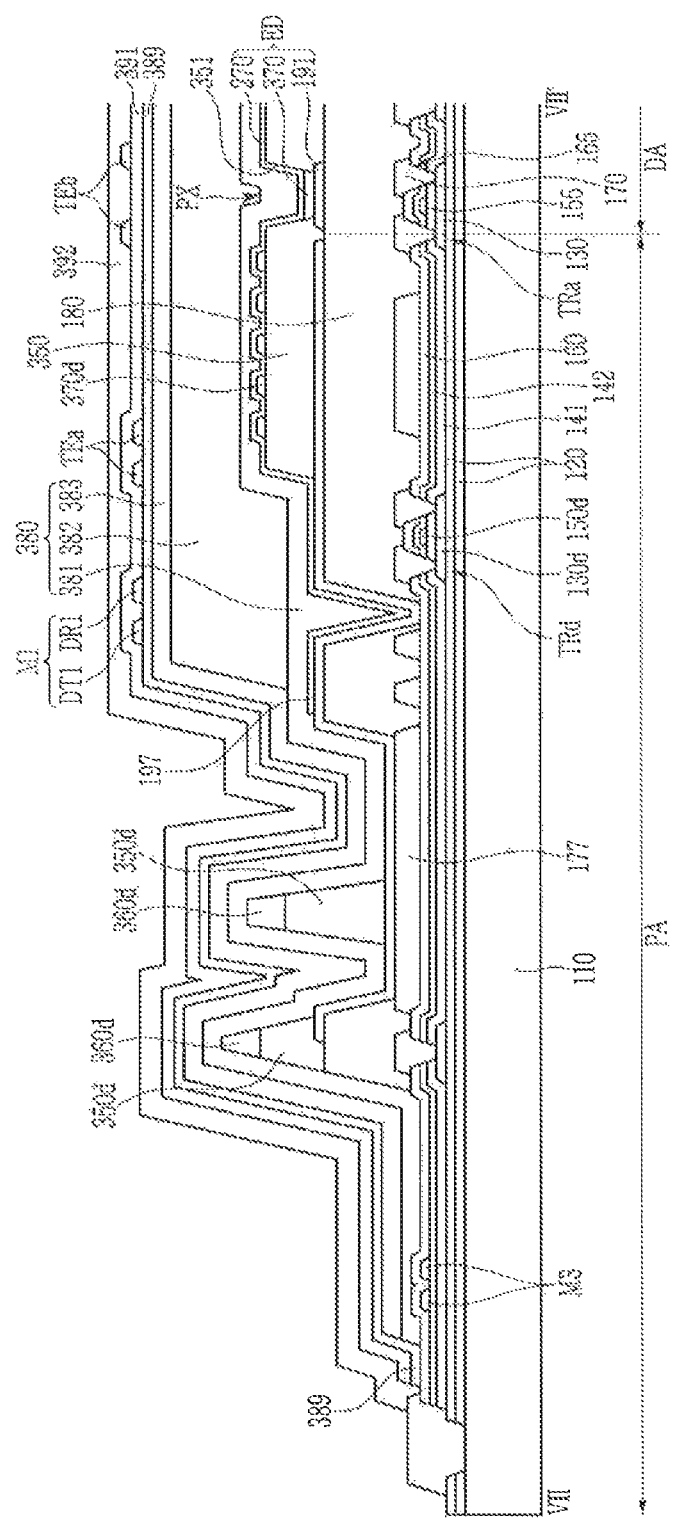
FIG. 7 illustrates a cross-sectional view of the display device taken along a line VII-VII' of FIG. 6 according to an exemplary embodiment of the present invention.

FIG. 6 illustrates a top plan view of a display device according to another exemplary embodiment of the present invention. FIG. 7 illustrates a cross-sectional view of the display device taken along a line VII-VII' of FIG. 6. FIG. 8 illustrates a circuit diagram showing a test controller included in the display device of FIG. 6. FIG. 9 shows examples of test results displayed in the display area when a test voltage is applied to the display device of FIG. 6. FIG. 10 illustrates a top plan view showing a display panel cut along a perforated line CL in the display device of FIG. 6.

Referring to the exemplary embodiment of the display panel 100B shown in FIG. 6, the peripheral area PA may include a bendable area BA that is configured to be bent. For example, the bendable area BA may be an area in which the display panel 100B can be bent rearward or frontward. Although the bendable area BA is illustrated as being disposed below the display area DA in the peripheral area PA in the exemplary embodiment shown in FIG. 6, the position, size and number of the bendable area BA are not limited thereto.

The peripheral area PA may include a third detection line M3, a fourth detection line M4, a fifth detection line M5, and a sixth detection line M6 which may not be connected to the hole crack detection line HCD.

The third detection line M3 may include a first end connected to the fourth test pad P4 and a second end connected to a test controller 700'. The third detection line M3 may be disposed in the peripheral area PA at left and upper sides of the display area DA. The third detection line M3 may be configured to extend from the fourth test pad P4 within the peripheral area PA along a left edge of the display area DA in the second direction D2. The third detection line M3 may then turn at the vicinity of an edge of the display panel 100B to extend along an upper edge of the display area DA in the first direction D1, and may turn at a central portion of the upper edge of the display area DA to return and to be connected to the test controller 700'. The third detection line M3 may be disposed outside of the first detection line M1. For example, the first detection line M1 may be disposed between the third detection line M3 and the display area DA, and the third detection line M3 may be disposed closer to an edge of the substrate 110 than the first detection line M1.

The fourth detection line M4 may include a first end connected to the fifth test pad P5 and a second end connected to the test controller 700'. The fourth detection line M4 may be disposed in the peripheral area PA at right and upper sides of the display area DA. The fourth detection line M4 may be configured to extend from the fifth test pad P5 within the peripheral area PA along a right edge of the display area DA in the second direction D2, and then may turn at the vicinity of an edge of the display panel 100B to extend along an upper edge of the display area DA in a direction opposite to the first direction D1. The fourth detection line M4 may turn at a central portion of the upper edge of the display area DA to return and to be connected to the test controller 700'. The fourth detection line M4 may be disposed outside of the second detection line M2. For example, the second detection line M2 may be disposed between the fourth detection line M4 and the display area DA, and the fourth detection line M4 may be disposed closer to an edge of the substrate 110 than the second detection line M2.

The fifth detection line M5 may include a first end connected to the sixth test pad P6 and a second end connected to the test controller 700'. The sixth detection line M6 may include a first end connected to the seventh test pad P7 and a second end connected to the test controller 700'. In an exemplary embodiment, the fifth detection line M5 and the sixth detection line M6 may be disposed in the bendable area BA. For example, the fifth detection line M5 may be disposed in the bendable area BA at a left edge of the display area DA, and the sixth detection line M6 may be disposed in the bendable area BA at a right edge of the display area DA. The fifth detection line M5 may extend from the sixth test pad P6 to the bendable area BA at the left edge of the substrate 110, and then may return and connect to the test controller 700'. The sixth detection line M6 may extend from the seventh test pad P7 to the bendable area BA at the right edge of the substrate 110, and then may return to be connected to the test controller 700'.

The third test pad P3, the fourth test pad P4, the fifth test pad P5, the sixth test pad P6, and the seventh test pad P7 may be arranged in the first direction D1 along a lower edge of the substrate 110 in the peripheral area PA.

Meanwhile, a portion of the peripheral area PA of the substrate 110 may be cut along a perforated line CL after the test process of the display device. FIG. 6 illustrates a portion of the peripheral area PA of the substrate 110 before being cut along the perforated line CL in an exemplary embodiment. FIG. 10 illustrates a portion of the peripheral area PA of the substrate 110 after being cut along the perforated line CL in an exemplary embodiment. As illustrated in FIG. 6, the perforated line CL may be disposed in the peripheral area PA and may be positioned closer to the lower edge of the substrate 110 than the third to seventh test pads P3 to P7. The perforated line CL may extend in the first direction D1.

In an exemplary embodiment, the first test pad P1 and the second test pad P2 may be disposed on a portion of the peripheral area PA of the substrate 110 which is removed by being cut along the perforated line CL. The first test pad P1 and the second test pad P2 may be disposed in a position that is closer to the lower edge of the substrate 110 than the perforated line CL.

The fourth test pad P4 and the sixth test pad P6 may be connected to the first test pad P1. The first detection transfer line DT1 connected to the first test pad P1 may extend from the first test pad P1 toward a portion between the fourth test pad P4 and the sixth test pad P6. The fifth test pad P5 and the seventh test pad P7 may be connected to the second test pad P2. The second detection transfer line DT2 connected to the second test pad P2 may extend from the second test pad P2 toward a portion between the fifth test pad P5 and the seventh test pad P7.

Figure 4:
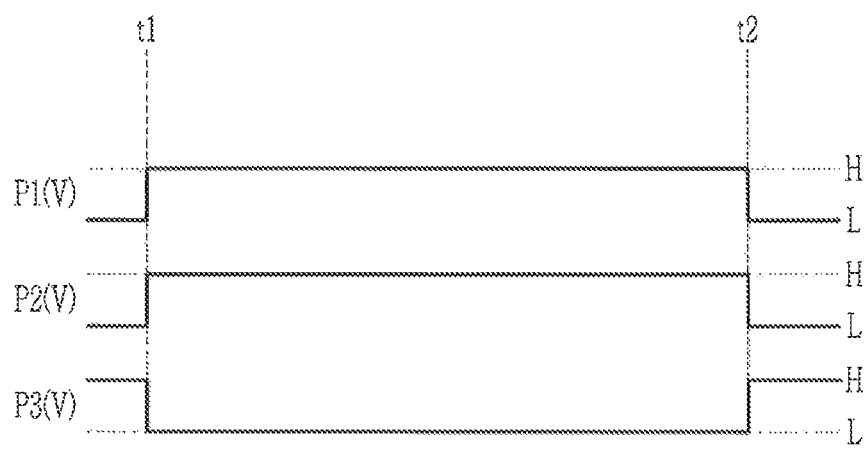
FIG. 4 illustrates a timing diagram showing an inspecting method according to an exemplary embodiment of the present invention.

As illustrated in the exemplary embodiment shown in FIG. 4, the display device may be tested by applying the first test voltage P1(V) to the first test pad P1, the second test voltage P2(V) to the second test pad P2, and the third test voltage P3(V) to the third test pad P3. As a result, the first test pad P1 may serve as a first common test pad that may apply the first test voltage P1(V) to the first detection line M1, the third detection line M3, and the fifth detection line M5. The second test pad P2 may serve as a second common test pad that may apply the second test voltage P2(V) to the second detection line M2, the fourth detection line M4, and the sixth detection line M6.

In addition, as the first test pad P1 and the second test pad P2 are removed after the test process of the display device, the first detection transfer line DT1 extends toward a portion between the fourth test pad P4 and the sixth test pad P6, and the second detection transfer line DT2 extends toward a portion between the fifth test pad P5 and the seventh test pad P7. However, it is possible to reduce the region for test pads and wires for a test process of the display device.

In an exemplary embodiment, the first detection line M1 and the second detection line M2 may be disposed in different conductive layers from the third detection line M3 and the fourth detection line M4. As illustrated in the exemplary embodiment shown in FIG. 7, the third detection line M3 may be disposed in the second conductive layer. Similarly, the fourth detection line M4 may also be disposed in the second conductive layer. In this embodiment, the first detection line M1 may be disposed in the fourth conductive layer. Similarly, the second detection line M2 may also be disposed in the fourth conductive layer. The first detection line M1 and the second detection line M2 may be disposed inward with respect to the dam portion 350d (e.g., between the display area DA and the dam portion 350d).

In another exemplary embodiment, the first detection line M1 and the second detection line M2 may be disposed in the same second conductive layer as the third detection line M3 and the fourth detection line M4. In this embodiment, the first detection line M1 and the second detection line M2 may be disposed in parallel with the third detection line M3 and the fourth detection line M4 at the inside or outside of the dam portion 350d.

Figure 8:
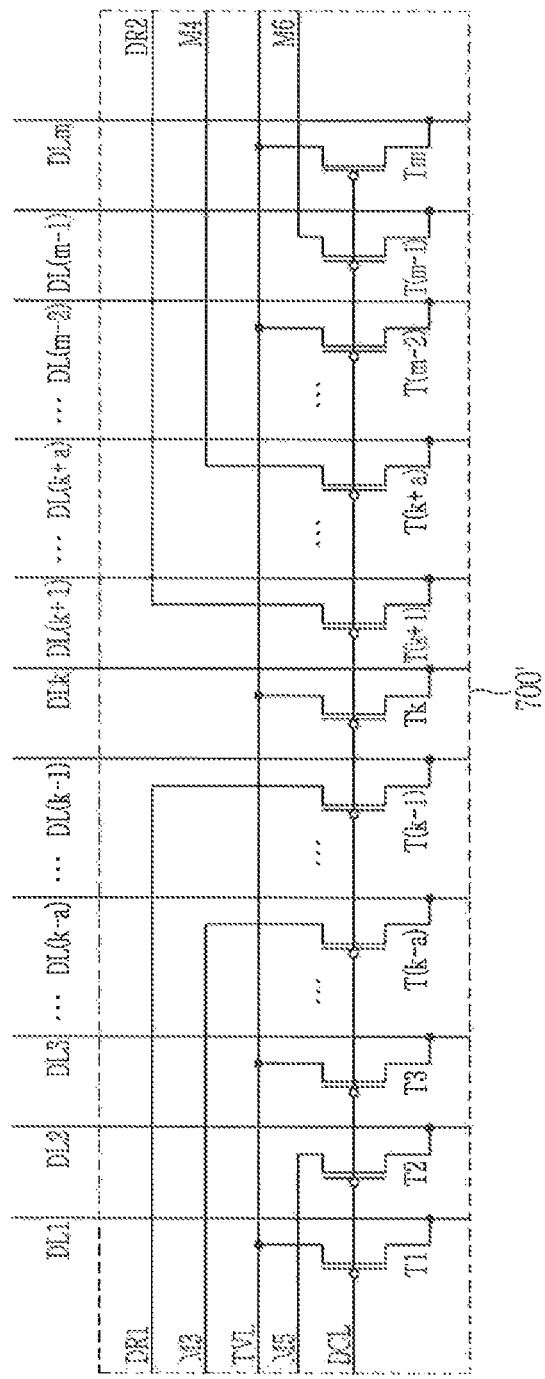
FIG. 8 illustrates a circuit diagram showing a test controller included in the display device of FIG. 6 according to an exemplary embodiment of the present invention.

Referring to FIG. 8, among the test transistors T1 to Tm included in the test controller 700', a second electrode of the $(k-a)^{th}$ test transistor T(k−a) may be connected to the third detection line M3, a second electrode of the $(k+a)^{th}$ test transistor T(k+a) may be connected to the fourth detection line M4, a second electrode of the second test transistor T2 may be connected to the fifth detection line M5, and a second electrode of the $(m-1)^{th}$ test transistor T(m−1) may be connected to the sixth detection line M6. Herein, "k−a" is greater than 3 and smaller than "k−1", and "k+a" is greater than "k+1" and smaller than "m−2".

Hereinafter, among the test transistors T1 to Tm included in the test controller 700', the test transistor T(k−a) connected to the third detection line M3 is referred to as a third bright-line transistor. The test transistor T(k+a) connected to the fourth detection line M4 is referred to as a fourth bright-line transistor. The test transistor T2 connected to the fifth detection line M5 is referred to as a fifth bright-line transistor, and the test transistor T(m−1) connected to the sixth detection line M6 is referred to as a sixth bright-line transistor. In addition, the data line DL(k−a) connected to the third bright-line transistor is referred to as a third test data line. The data line DL(k+a) connected to the fourth bright-line transistor is referred to as a fourth test data line. The data line DL2 connected to the fifth bright-line transistor is referred to as a fifth test data line. The data line DL(m−1) is referred to as a sixth test data line.

For testing the display device, the first test voltage P1(V) may be applied to the first test pad P1, the second test voltage P2(V) may be applied to the second test pad P2, and the third test voltage P3(V) may be applied to the third test pad P3. In this case, the first test voltage P1(V) may be written in the pixels PX connected to the third test data line through the third detection line M3 and the third bright-line transistor. The second test voltage P2(V) may be written in the pixels PX connected to the fourth test data line through the fourth detection line M4 and the fourth bright-line transistor. The first test voltage P1(V) may be written in the pixels PX connected to the fifth test data line through the fifth detection line M5 and the fifth bright-line transistor. The second test voltage P2(V) may be written in the pixels PX connected to the sixth test data line through the sixth detection line M6 and the sixth bright-line transistor.

Figure 9:
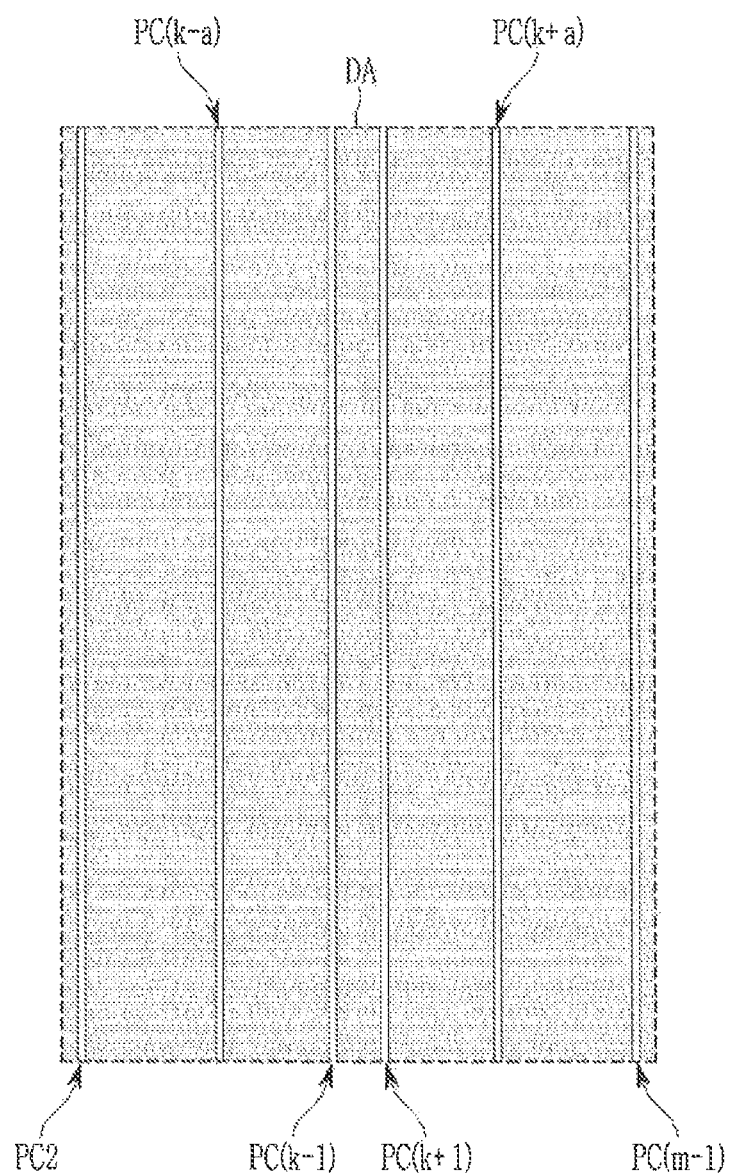
FIG. 9 shows examples of test results displayed in the display area when a test voltage is applied to the display device of FIG. 6 according to an exemplary embodiment of the present invention.
Figure 10:
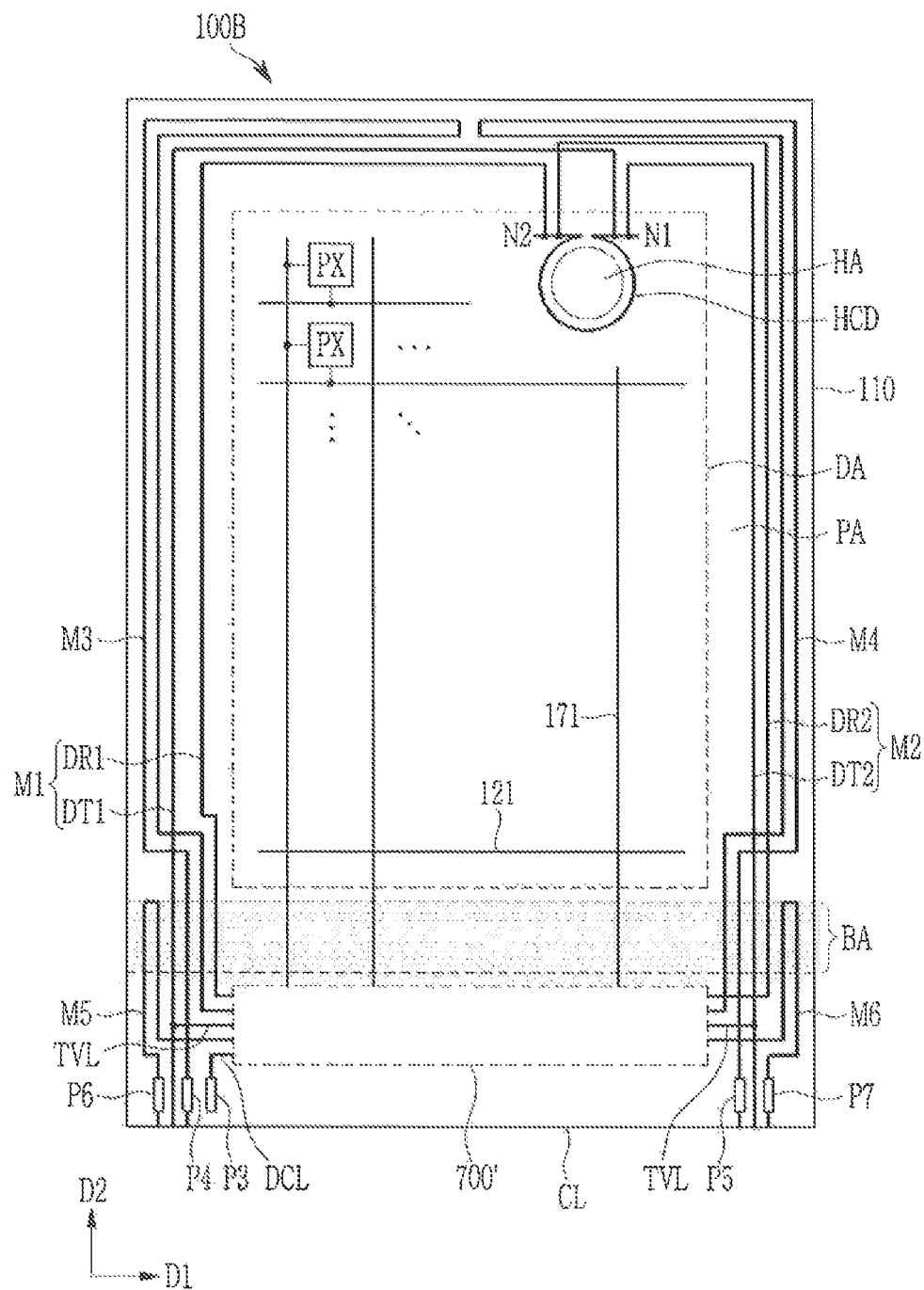
FIG. 10 illustrates a top plan view showing a display panel cut along a perforated line in the display device of FIG. 6 according to an exemplary embodiment of the present invention.

When a crack occurs in the third detection line M3, a pixel array PC(k−a) including the pixels PX connected to the third test data line may be visually recognized as a third bright line as illustrated in FIG. 9. When the third bright line is visually recognized, it is indicative of a crack defect at a left edge or an upper edge of the display panel 100B.

When a crack occurs in the fourth detection line M4, a pixel array PC(k+a) including the pixels PX connected to the fourth test data line may be visually recognized as a fourth bright line as illustrated in FIG. 9. When the fourth bright line is visually recognized, it is indicative of a crack defect at a right edge or the upper edge of the display panel 100B.

When a crack occurs in the fifth detection line M5, a pixel array PC2 including the pixels PX connected to the fifth test data line may be visually recognized as a fifth bright line as illustrated in FIG. 9. When the fifth bright line is visually recognized, it is indicative of a crack defect in a left portion of the bendable area BA of the display panel 100B.

When a crack occurs in the sixth detection line M6, a pixel array PC(m−1) including the pixels PX connected to the sixth test data line may be visually recognized as a sixth bright line as illustrated in FIG. 9. When the sixth bright line is visually recognized, it is indicative of a crack defect in a right portion of the bendable area BA of the display panel 100B.

As the first bright line and the second bright line are disposed at a central portion of the display area DA, the fifth bright line and the sixth bright line are disposed at a left edge and a right edge within the display area DA, and the third bright line and the fourth bright line are disposed at a left central portion and a right central portion within the display area DA, it is possible for the user to easily determine which portion of the display panel 100B has a crack defect when the display device is visually tested.

Except for these differences, the features of the exemplary embodiments described above with reference to FIGS. 1-5 may be applied to all of the exemplary embodiments described with reference to FIGS. 6-10, so a redundant description is omitted among the exemplary embodiments.

While exemplary embodiments of the present inventive concept have been particularly shown and described with reference to the accompanying drawings, the specific terms used herein are only for the purpose of describing the inventive concept and are not intended to define the meanings thereof or be limiting of the scope of the inventive concept set forth in the claims. Therefore, those skilled in the art will understand that various modifications and other equivalent embodiments of the present inventive concept are possible. Consequently, the true technical protective scope of the present inventive concept must be determined based on the technical spirit of the appended claims.

What is claimed is:

1. A display device comprising:
a display area that includes a plurality of pixels and a plurality of data lines connected to the pixels;
a hole area disposed within the display area;
a hole crack detection line disposed adjacent to the hole area, the hole crack detection line surrounding the hole area and having a first end and a second end that are separated from each other;
a first detection line that includes a first detection transfer line connected to the first end of the hole crack detection line and a first detection receiving line connected to the second end of the hole crack detection line;
a second detection line that includes a second detection transfer line connected to the first end of the hole crack detection line and a second detection receiving line connected to the second end of the hole crack detection line; and
a test controller configured to electrically connect the first detection receiving line to a first data line of the plurality of data lines and the second detection receiving line to a second data line of the plurality of the data lines.

2. The display device of claim 1, further comprising:
a test voltage line that includes a first end connected to the first detection transfer line and a second end connected to the second detection transfer line.

3. The display device of claim 2, wherein:
the test controller includes a plurality of test transistors connected to the data lines;

first electrodes of the test transistors are connected to the respective data lines; and
the test transistors further including second electrodes;
wherein a second electrode of a first bright-line transistor of the plurality of test transistors is connected with the first detection receiving line, and a second electrode of a second bright-line transistor of the plurality of test transistors is connected with the second detection receiving line.

4. The display device of claim 3, wherein each of the second electrodes of the test transistors are connected with the test voltage line except for the second electrode of the first bright-line transistor and the second electrode of the second bright-line transistor.

5. The display device of claim 3, wherein:
pixels connected to the first data line connected to the first bright-line transistor are configured to emit light when a crack occurs in the hole crack detection line to display a first bright line; and
pixels connected to the second data line connected to the second bright-line transistor are configured to emit light when a crack occurs in the hole crack detection line to display a second bright line.

6. The display device of claim 5, wherein the first bright line and the second bright line are disposed at a central portion of the display area.

7. The display device of claim 3, wherein:
the first detection transfer line is connected to a first test pad to which a first test voltage is applied; and
the second detection transfer line is connected to a second test pad to which a second test voltage is applied.

8. The display device of claim 7, further comprising:
a detection control line configured to have a first end connected to a third test pad and a second end connected to a gate electrode of each of the plurality of test transistors.

9. The display device of claim 8, further comprising:
a third detection line which includes a first end that is connected to a fourth test pad, wherein the third detection line is configured to extend along an edge of a first side of the display area and return to connect a second electrode of a third bright-line transistor included in the test transistors; and
a fourth detection line configured to have a first end that is connected to a fifth test pad, wherein the fourth detection line is configured to extend along an edge of a second side of the display area and return to connect to a second electrode of a fourth bright-line transistor included in the test transistors.

10. The display device of claim 9, further comprising:
a bendable area disposed around the display area;
a fifth detection line that includes a first end that is connected to a sixth test pad, wherein the fifth detection line is configured to extend to the bendable area and return to connect to a second electrode of a fifth bright-line transistor included in the test transistors; and
a sixth detection line that includes a first end that is connected to a seventh test pad, wherein the sixth detection line is configured to extend to the bendable area and return to connect to a second electrode of a sixth bright-line transistor included in the test transistors.

11. The display device of claim 10, wherein:
the fourth test pad and the sixth test pad are connected to the first test pad, wherein the first test pad serves as a first common test pad; and the fifth test pad and the seventh test pad are connected to the second test pad, wherein the second test pad serves as a second common test pad.

12. The display device of claim 11, wherein:
the first detection transfer line is configured to extend to a portion between the fourth test pad and the sixth test pad, and
the second detection transfer line is configured to extend to a portion between the fifth test pad and the seventh test pad.

13. The display device of claim 11, wherein:
at least one of a pixel connected to a data line connected to the third bright-line transistor, a pixel connected to a data line connected to the fourth bright-line transistor, a pixel connected to a data line connected to the fifth bright-line transistor, and a pixel connected to a data line connected to the sixth bright-line transistor are configured to emit light when a test voltage is applied to the first test pad and the second test pad.

14. A method for inspection of a display device that includes a display area including a plurality of pixels and a plurality of data lines connected with the pixels, comprising:
applying a first test voltage to a first detection line, the first detection line being connected to a hole crack detection line that is disposed adjacent to a hole area disposed in a display area of the display device;
applying a second test voltage to a second detection line which is connected with the hole crack detection line;
electrically connecting the first detection line to a first data line of the plurality of data lines through a first bright-line transistor; and
electrically connecting the second detection line to a second data line of the plurality of data lines through a second bright-line transistor.

15. The method of claim 14, further comprising
emitting light by at least one of a pixel connected to the first data line and a pixel connected to the second data line.

16. The method of claim 15, further comprising the step of:
emitting light by the pixel connected to the first data line connected to the first bright-line transistor when a crack occurs in the hole crack detection line to display a first bright line; and
emitting light by the pixel connected to the second data line connected to the second bright-line transistor when a crack occurs in the hole crack detection line to display a second bright line.

17. The method of claim 15, wherein:
a first bright line is emitted by the pixel connected to the first data line and a second bright line is emitted by the pixel connected to the second data line at a central portion of the display area.

18. The method of claim 14, wherein
the first detection line includes a first detection transfer line connected to a first end of the hole crack detection line and a first detection receiving line connected to a second end of the hole crack detection line, and
the second detection line includes a second detection transfer line connected to the first end of the hole crack detection line and a second detection receiving line connected to the second end of the hole crack detection line.

19. A method for inspection of a display device including a plurality of pixels and a hole area disposed in a display area, the method comprising
emitting light by a plurality of pixels included in a first bright line and a second bright line that are electrically connected to a hole crack detection line disposed adjacent to the hole area and surrounds the hole area, wherein the first bright line and the second bright line are disposed at a central portion of the display area.

20. The method of claim 19, further comprising
emitting light by a pixel included in one of a third bright line and a fourth bright line that are electrically connected to a detection line disposed along edges of opposite sides of the display area,
wherein the third bright line and the fourth bright line are respectively disposed in left and right sides within the display area.

* * * * *